United States Patent
Lee et al.

(10) Patent No.: US 9,766,767 B2
(45) Date of Patent: Sep. 19, 2017

(54) METHOD AND APPARATUS FOR ENTERING TEXT IN PORTABLE TERMINAL

(71) Applicant: Samsung Electronics Co. Ltd., Suwon-si, Gyeonggi-do (KR)

(72) Inventors: Gi-Yong Lee, Suwon-si (KR); Sung-Hwan Baek, Suwon-si (KR); Do-Hee Chung, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 633 days.

(21) Appl. No.: 13/872,489

(22) Filed: Apr. 29, 2013

(65) Prior Publication Data

US 2013/0298072 A1 Nov. 7, 2013

(30) Foreign Application Priority Data

May 2, 2012 (KR) .......................... 10-2012-0046338

(51) Int. Cl.
*G06F 3/048* (2013.01)
*G06F 3/0481* (2013.01)
*G06F 3/0485* (2013.01)
*G06F 3/0488* (2013.01)

(52) U.S. Cl.
CPC .......... *G06F 3/0481* (2013.01); *G06F 3/0485* (2013.01); *G06F 3/04886* (2013.01)

(58) Field of Classification Search
None
See application file for complete search history.

(56) References Cited

U.S. PATENT DOCUMENTS

| | | | | |
|---|---|---|---|---|
| 5,611,040 A | * | 3/1997 | Brewer | G06F 3/04812 715/781 |
| 6,154,205 A | * | 11/2000 | Carroll | G06F 17/30905 345/684 |
| 7,735,016 B2 | * | 6/2010 | Celik | G06F 3/0481 715/767 |
| 9,164,649 B2 | * | 10/2015 | Dent | G06F 3/0481 |
| 2002/0085038 A1 | | 7/2002 | Cobbley et al. | |

(Continued)

FOREIGN PATENT DOCUMENTS

| | | | |
|---|---|---|---|
| CN | 102270057 A | 12/2011 | |
| EP | 1225506 A2 * | 7/2002 | ............ G06F 3/033 |
| JP | 2007-183787 A | 7/2007 | |

OTHER PUBLICATIONS

TheFreeWindows, Scroll a Microsfot Word document, without moving the cursor, Sep. 27, 2009.*

(Continued)

*Primary Examiner* — Mahelet Shiberou
(74) *Attorney, Agent, or Firm* — Jefferson IP Law, LLP (57) ABSTRACT

A method and an apparatus for entering text in a portable terminal are provided. The method includes focusing on a selected text field and displaying a SIP, when the predefined text field is selected from among text fields, scroll-displaying the text fields in a display area in response to a requested scroll, when a user requests the scroll of the display area of the text fields, and identifying, from a result of the scroll display, whether the selected text field is being displayed in the display area, and determining whether text is to be entered into the selected text field.

18 Claims, 5 Drawing Sheets

(56) References Cited

U.S. PATENT DOCUMENTS

| | | | |
|---|---|---|---|
| 2005/0097479 A1* | 5/2005 | Takabe | H04N 7/163 715/851 |
| 2006/0001652 A1 | 1/2006 | Chiu et al. | |
| 2006/0262102 A1* | 11/2006 | Lee | G06F 9/4443 345/173 |
| 2011/0093811 A1* | 4/2011 | Park | G06F 3/0485 715/785 |
| 2011/0302520 A1 | 12/2011 | Yuasa et al. | |
| 2012/0113025 A1* | 5/2012 | Koch | G06F 3/04886 345/173 |
| 2012/0147037 A1* | 6/2012 | Takami | G06F 17/30991 345/629 |
| 2013/0111391 A1* | 5/2013 | Penner | G06F 3/04886 715/773 |
| 2013/0283195 A1* | 10/2013 | Bilgen | G06F 3/04886 715/767 |
| 2014/0333675 A1* | 11/2014 | Nakaoka | G09G 5/34 345/684 |

OTHER PUBLICATIONS

Designing Mobile Interfaces, Steven Hoober, Eric Berkman, Nov. 23, 2011, chapter 3 and 11.*
PDF Document for EP 1225506 A2, Tricklebank, Stuart, Jul. 24, 2002.*
ITeye technical website: http://unicorn25.iteye.com/blog/916504 Feb. 22, 2011.

* cited by examiner

METHOD AND APPARATUS FOR ENTERING TEXT IN PORTABLE TERMINAL

PRIORITY

This application claims the benefit under 35 U.S.C. §119 (a) of a Korean patent application filed in the Korean Intellectual Property Office on May 2, 2012 and assigned Serial No. 10-2012-0046338, the entire disclosure of which is hereby incorporated by reference.

BACKGROUND OF THE INVENTION

1. Field of the Invention

The present invention relates to a portable terminal. More particularly, the present invention relates to a method and an apparatus for performing a key input by using a Soft Input Panel (SIP) in a portable terminal.

2. Description of the Related Art

With the improvement of the performance of electronic devices, a recent electronic device provides various functions instead of one simple function. For example, a portable terminal, such as a tablet Personal Computer (PC) or a smart phone, provides countless various functions of a multimedia player, an e-book reader, a text editor, a video game console, and the like.

It is usual that such a recent portable terminal is provided in such a manner as to include a display unit providing a touch screen function. A user enters text through a SIP, instead of through a keyboard implemented by hardware.

Namely, it is usual that text is entered through the SIP into the recent portable terminal. However, a text field, into which text can be entered, and a SIP needs to be simultaneously displayed within a limited display screen. Accordingly, problems occur in entering text. Problems which can occur during entering of text will be described below with reference to FIGS. 1A through 1C.

Figure 1A:
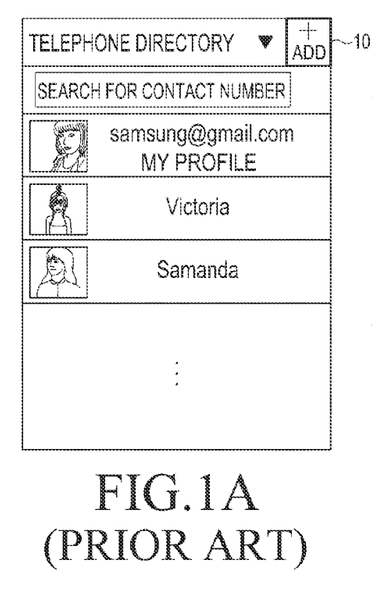
FIGS. 1A through 1C illustrate entering text according to the prior art.
Figure 1B:
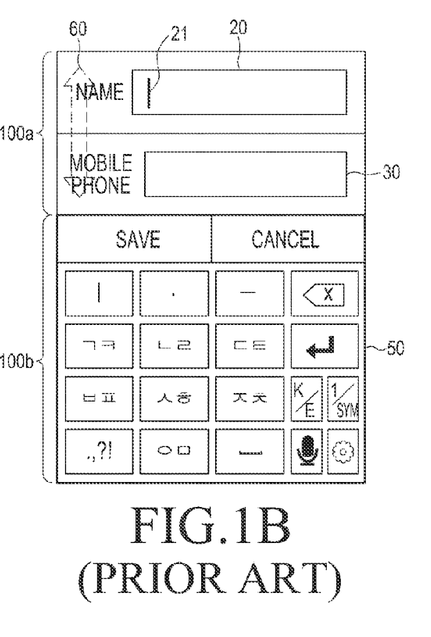
Figure 1C:
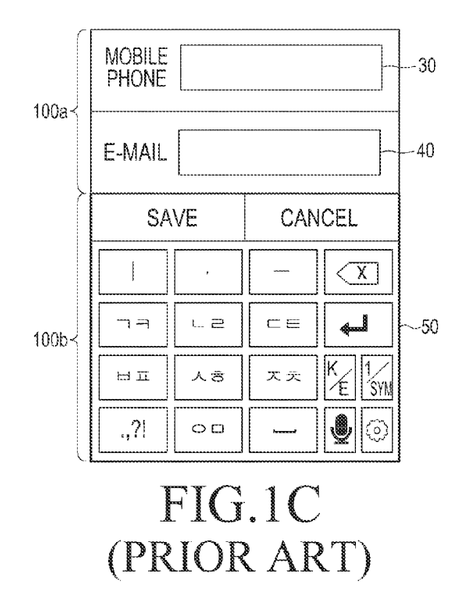

FIGS. 1A through 1C illustrate entering text according to the prior art, and show an example of adding a new contact number to a telephone directory among various examples of entering text.

In a telephone directory as shown in FIG. 1A, a user can first select a soft menu 10, and can add a contact number. When the soft menu 10 is selected (for example, when the soft menu 10 is touched), the screen as shown in FIG. 1A is changed to a setting screen for adding a contact number, as shown in FIG. 1B.

The user can select (for example, can touch) a text field, into which text is intended to be entered among text fields 20 and 30, on a screen as shown in FIG. 1B. When the text field is selected, the relevant text field is focused in order to enable the entering of text.

For example, on the screen as shown in FIG. 1B, when a text field 20 enabling the addition of a name of a contact number is selected, a portable terminal focuses on the text field 20 through the blinking of a cursor 21. At this time, text that the user enters through a SIP 50, is entered into only the focused text field 20.

Meanwhile, when the SIP 50 is displayed, a display screen is divided into a display area 100a, in which text fields are displayed, and a display area 100b, in which a SIP 50 is displayed. This configuration implies that all text fields cannot be displayed in the display area enabling the display of text fields.

Accordingly, when the prior art is used, when the user intends to identify a list of text fields other than text fields 20 and 30 in FIG. 1B which are being displayed (or when the user intends to insert text into a relevant text field), the user can enter a scroll input (for example, a scroll touch input 60), and can request the display of the list of other text fields.

For example, on the display screen as shown in FIG. 1B, the user can enter a scroll input for scrolling the display area 100a in order to identify a text field located below the text field 30. As a result, the text field (for example, a text field 40 for entering of an e-mail address) located below the text field 30 is displayed as shown in FIG. 1C.

However, when the prior art as described above is used, the text field 20 which has been kept focused in the previous step in order to enter text, is no longer displayed on the display screen as shown in FIG. 1C. Accordingly, the prior art has a problem in that the user cannot identify text which is being entered into the text field 20.

Accordingly, the user needs to again perform the scroll of the display area 100a in order to display the text field 20, and needs to continuously enter text into the text field 20. Otherwise, the user needs to select the text field 30 or the text field 40 in such a manner as to focus on the text field 30 or the text field 40 in order to enter text into the text field 30 or the text field 40.

Namely, in the case of the prior art, a text field which is being focused (namely, into which text is being entered) is not displayed by a scroll operation activated by the user. Accordingly, the prior art has several inconveniences occurring in the case of entering text into a text field.

Accordingly, when text is entered into multiple text fields by using the SIP, a need exists for a method and an apparatus for entering text, which is more convenient to a user when the text is entered into multiple text fields in a portable terminal.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address the above-mentioned problems and/or disadvantages and to provide at least the advantages described below. Accordingly, an aspect of the present invention is to provide a method and an apparatus for entering text, which is more convenient to a user when the text is entered into multiple text fields by using a Soft Input Panel (SIP) in a portable terminal.

In accordance with an aspect of the present invention, a method for entering text in a portable terminal is provided. The method includes focusing on a selected text field and displaying a SIP, when the predefined text field is selected from among text fields, scroll-displaying the text fields in a display area in response to a requested scroll, when a user requests the scroll of the display area of the text fields, and identifying, from a result of the scroll display, whether the selected text field is being displayed in the display area, and determining whether text is to be entered into the selected text field.

In accordance with an aspect of the present invention, an apparatus for entering text in a portable terminal is provided. The apparatus includes a display unit and a controller for performing a control operation so as to focus on a selected text field and display a SIP on the display unit when the predefined text field is selected from among text fields displayed on the display unit, so as to scroll-display the text fields in a display area in response to a requested scroll when a user requests the scroll of the display area of the text fields, so as to identify, from a result of the scroll display, whether the selected text field is being displayed in the display area, and so as to determine whether text is to be entered into the selected text field.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention provide a method and an apparatus for entering text, which is more convenient to a user when the text is entered into multiple text fields by using a Soft Input Panel (SIP) in a portable terminal.

It is assumed that portable terminals correspond to easily-carried electronic devices, such as a feature phone, a tablet Personal Computer (PC), a smart phone which runs on a mobile Operating System (OS), such as Windows 8, iOS, Android, or Bada, and a laptop computer which runs on Windows or Mac environment.

Figure 2:
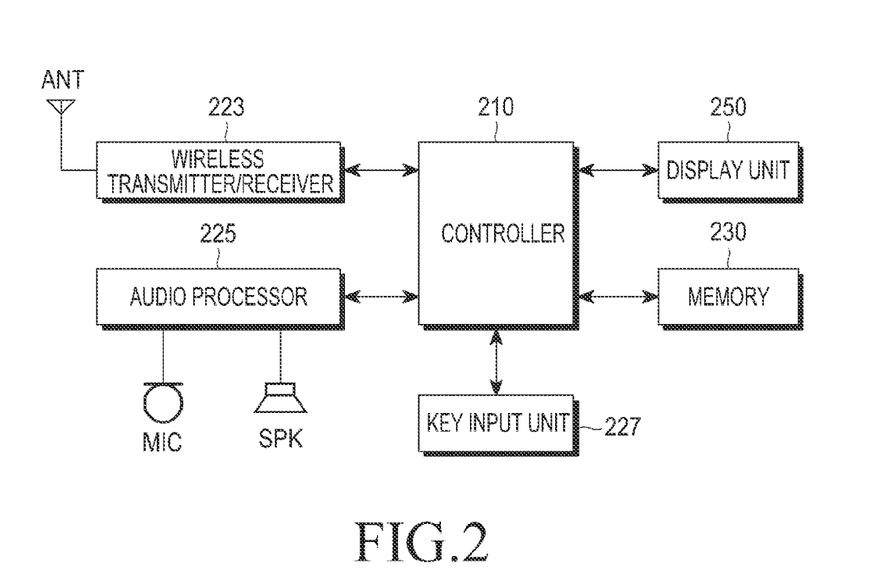
FIG. 2 is a block diagram illustrating a configuration of a portable terminal according to an exemplary embodiment of the present invention.

FIG. 2 is a block diagram illustrating a configuration of a portable terminal according to an exemplary embodiment of the present invention.

Referring to FIG. 2, a wireless transmitter/receiver 223 includes a Radio Frequency (RF) unit and a modem (modulator/demodulator). The RF unit includes an RF transmitter for upconverting the frequency of a signal to be transmitted and for amplifying the frequency-upconverted signal, an RF receiver for low-noise amplifying a received signal and downconverting the frequency of the low-noise amplified signal, and the like. The modem includes a transmitter for encoding and modulating a signal to be transmitted, a receiver for demodulating and decoding a signal received by the RF unit, and the like.

An audio processor 225 may include a codec (coder/decoder), and the codec may include a data codec and an audio codec. The data codec processes packet data, and the like, and the audio codec processes audio signals including voice, a multimedia file, and the like. The audio processor 225 converts a digital audio signal, which has been received by the modem, to an analog signal through the audio codec, and reproduces the analog signal. In addition, the audio processor 225 converts an analog audio signal, which is generated from a microphone, to a digital audio signal through the audio codec, and transmits the digital audio signal to the modem. The codec may be separately provided, or may be included in a controller 210 of the portable terminal.

A key input unit 227 may include keys for inputting numbers and text information and function keys for setting various functions, and may be in the form of a touchpad, or the like. When a display unit 250 employs a capacitive/electrostatic touch screen, a resistive/pressure-sensitive touch screen or the like, the key input unit 227 may include only a minimum number of keys, which have previously been set. In this case, the display unit 250 may partially perform a key input function of the key input unit 227, in place of the key input unit 227.

A memory 230 may include a program memory and a data memory, and the program memory stores programs for controlling a general operation of the portable terminal. The memory 230 may further include external memories, including a Compact Flash (CF) memory card, a Secure Digital (SD) memory card, a Micro Secure Digital (Micro-SD) memory card, a Mini Secure Digital (Mini-SD) memory card, an Extreme Digital (XD) memory card, a memory stick, and the like. In addition, the memory 230 may include disks, including a Hard Disk Drive (HDD), a Solid State Disk (SSD), and the like.

The display unit 250 may be implemented by a Liquid Crystal Display (LCD), and/or an Organic Light-Emitting Diode (OLED), such as either a Passive Matrix Organic LED (PMOLED) or an Active Matrix Organic LED (AMO- LED), and outputs various pieces of display information provided by the portable terminal. The display unit 250 may include a capacitive/electrostatic touch screen or a resistive/pressure-sensitive touch screen, and may serve as an input unit for controlling the portable terminal, together with the key input unit 227.

The display unit 250 displays a SIP corresponding to a virtual keyboard, and a user may enter a user input (for example, text) through the SIP.

The controller 210 may control an overall operation of the portable terminal and may change and control the operation of the portable terminal by a user's input provided by either the key input unit 227, the display unit 250, or the like. The controller 210 performs a control operation so as to focus on a selected text field and display a SIP on the display unit when the predefined text field is selected from among text fields displayed by the display unit 250, so as to scroll-display the text fields in a display area in response to a requested scroll when a user requests the scroll of the display area of the text fields, so as to identify, from a result of the scroll display, whether the selected text field is being displayed in the display area, and so as to determine whether text is to be entered into the selected text field. An operation of the controller 210 will be explained through the following description.

Meanwhile, although devices, including a Bluetooth module, a camera module, a Global Positioning System (GPS) module, a Wi-Fi module, a proximity sensor, a Digital Multimedia Broadcasting (DMB) receiver, and the like, which may be included in a portable terminal, are not shown in the block diagram of FIG. 2, it will be apparent to those skilled in the art that these devices, which are not shown in FIG. 2, may be included in a portable terminal in order to provide the relevant functions of these devices.

Figure 3:
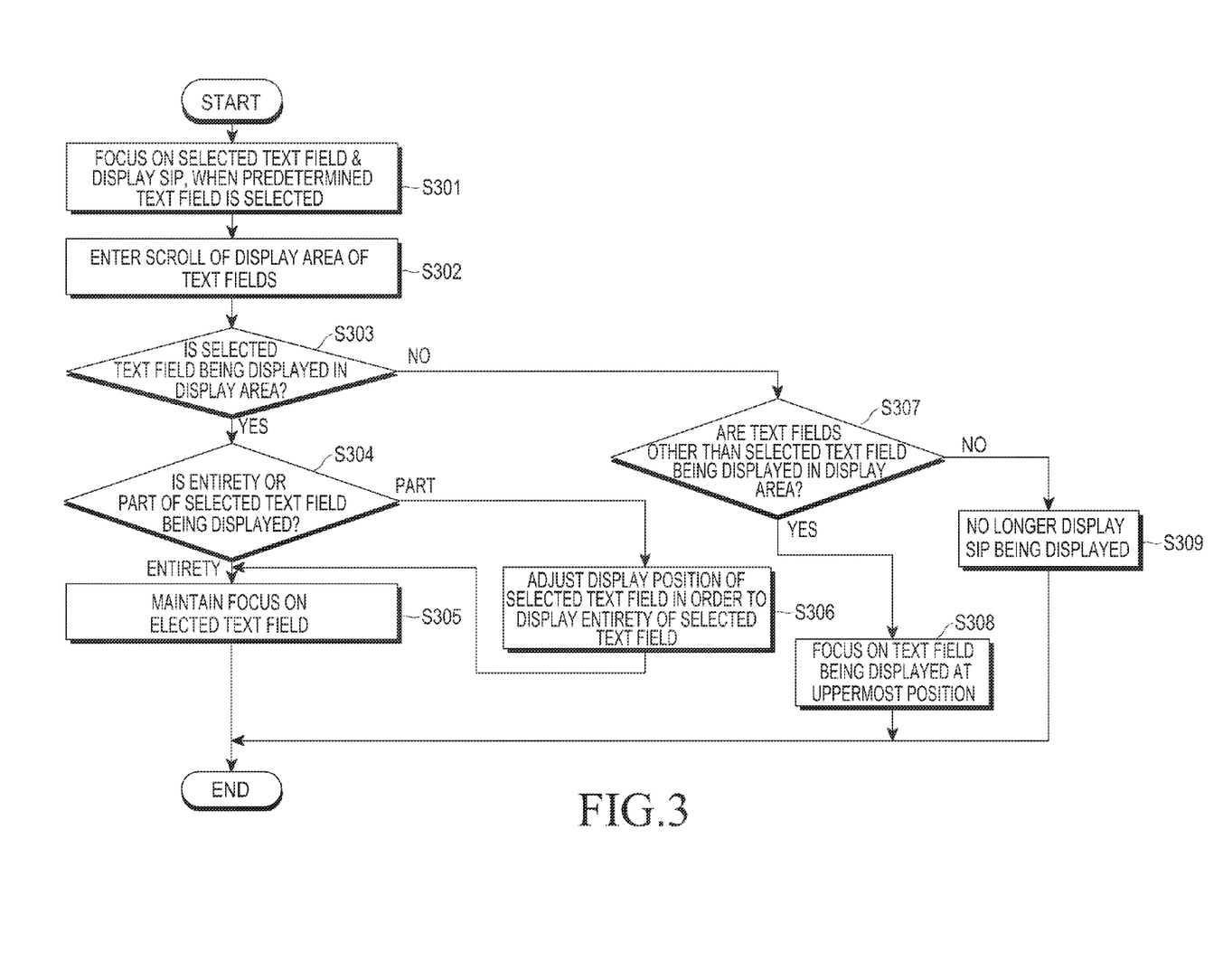
FIG. 3 is a flowchart illustrating a process for entering text according to an exemplary embodiment of the present invention.

FIG. 3 is a flowchart illustrating a process for entering text according to an exemplary embodiment of the present invention. FIGS. 4A through 4D illustrate a process for entering text according to an exemplary embodiment of the present invention. FIGS. 5A through 5D illustrate a process for entering text according to an exemplary embodiment of the present invention. An exemplary embodiment of the present invention will be described below with reference to FIGS. 3 through 5D.

Referring to FIG. 3, when a predefined text field is selected, the controller 210 performs a control operation so as to focus on the selected text field, and so as to display a SIP in step S301.

Referring to FIGS. 4A through 5D, FIG. 4A shows an example of text fields displayed so that a user sets registration information of an added contact number when the contact number is added to a telephone directory.

Figure 4A:
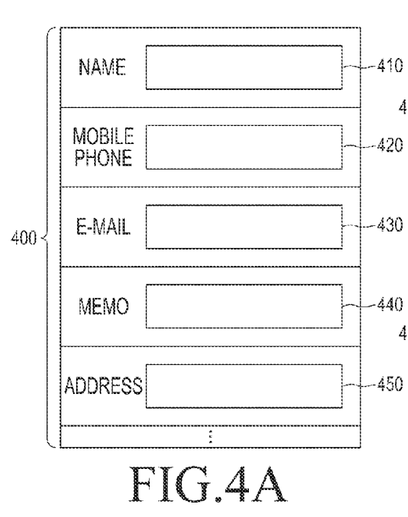
FIGS. 4A through 4D illustrate a process for entering text according to an exemplary embodiment of the present invention.

On a display screen as shown in FIG. 4A, in order to enter registration information of the contact number, the user may select (for example, may touch) any one of text fields 410, 420, 430, 440 and 450.

When any one text field is selected, the controller 210 performs a control operation so as to divide a display screen 400 as shown in FIG. 4A into two areas 400a and 400b, so as to display a preset number (e.g., 2) of text fields, which include the selected text field among text fields, in a display area 400a of text fields, and so as to display a SIP 460 in a display area 400b of a keyboard.

Figure 4B:
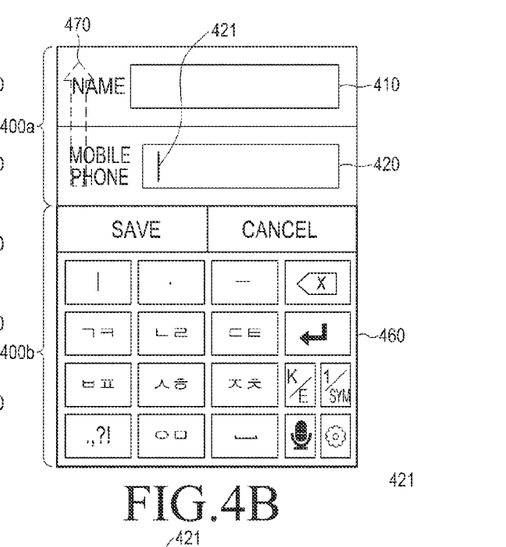

When it is assumed that the text field 420 for entering a mobile phone number is selected, the controller 210 performs a control operation so as to focus on the text field 420 while performing a control operation for displaying the text fields 410 and 420 in the display area 400a of text fields, so as to notify the user of the focus on the text field 420 through the indication (for example, blinking) of a cursor 421, and so as to display the SIP 460.

In an exemplary embodiment of the present invention, focusing on a text field implies that text entered through the SIP is entered into the focused text field. Accordingly, when the text field 420 is focused, text entered through the SIP 460 may be entered into only the text field 420.

In steps S302 and S303, when the scroll of the display area of text fields is entered, the controller 210 performs a control operation so as to first scroll-display text fields in response to the entering of the scroll, and so as to identify whether a selected text field is being displayed in the display area of text fields.

The user may enter text into the text field 420 by using the SIP on a display screen as shown in FIG. 4B. However, the user may desire to identify the text fields 410, 420, 430, 440 and 450 in FIG. 4A. Otherwise, the user may desire to select a text field other than a text field, which is currently being selected, in FIG. 4A.

When the user enters a scroll input 470 in FIG. 4B for scrolling the display area 400a of text fields, the controller 210 performs a control operation so as to scroll-display text fields in response to the entered scroll input, and so as to display text fields (for example, the text field 430) located below the text field 420.

Types of text fields displayed in the display area 400a of the text fields are changed according to a type such that the user enters the scroll input 470 (for example, the user enters the scroll input 470 for a long period of time, or the user repeatedly enters the scroll input 470). In other words, according to a degree such that the user enters a scroll input for scrolling the display area 400a of text fields, the selected (i.e., currently-focused) text field 420 may be displayed in the display area 400a of text fields, or may not be displayed therein.

Accordingly, after performing a control operation for scroll-displaying text fields in response to the scroll input of the user, the controller 210 performs a control operation for identifying whether the text field (for example, the text field 420) selected (namely, focused) in step S301 is being displayed in the display area 400a of text fields.

In steps S304 through S306, the controller 210 performs a control operation for identifying whether an entirety or a part of the selected text field is being displayed in the display area. When the entirety of the selected text field is being displayed in the display area, the controller 210 performs a control operation for maintaining the focus on the selected text field. In contrast, when the part of the selected text field is being displayed in the display area, the controller 210 performs a control operation for adjusting a display position of the text field in order to display the entire selected text field.

Figure 4C:
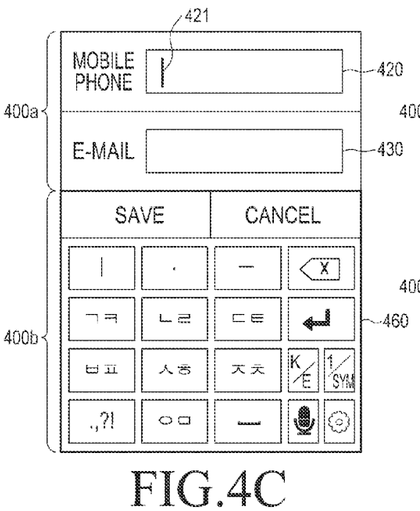

When a result of the identification shows that the entirety of the selected (focused) text field 420 is being displayed in the display area 400a of text fields as shown in FIG. 4C, the controller 210 performs a control operation for maintaining the focus on the selected text field 420. In addition, the user may identify that the text field 420 is being focused even after the scroll of the text field 420, through the cursor 421 displayed in a state of blinking. Namely, text entered through the SIP 460 is entered into the text field 420 which is kept focused.

At this time, in an exemplary embodiment of the present invention, the meaning of an entirety of a text field in the case where a result of the identification shows that the entirety of the text field is being displayed, includes a case where the text field is displayed to such a degree that the user may recognize text entered into the relevant text field, and a case where the entire text field is displayed in terms of literal meaning.

Figure 4D:
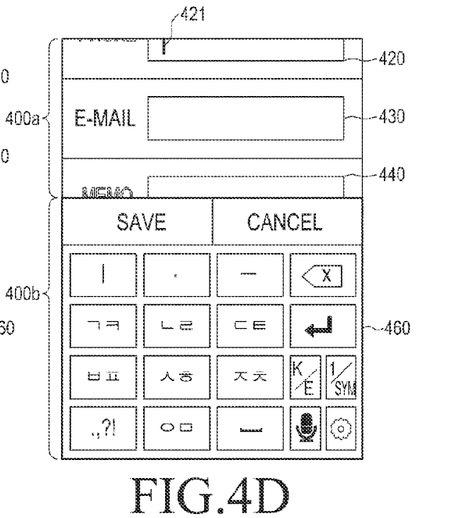

Meanwhile, when a result of the identification shows that only the part of the selected (focused) text field 420 is being displayed in the display area 400a of text fields as shown in FIG. 4D, the controller 210 performs a control operation for adjusting a display position of the text field 420 in order to display an entirety (for example, as shown in FIG. 4C) of the selected text field (namely, the text field, only the part of which is being displayed).

For example, when a result of the identification shows that only the part of the selected text field 420 is displayed as shown in FIG. 4D due to the entered scroll 470 on a display screen as shown in FIG. 4B, the controller 210 performs a control operation for performing an automatic scroll of the display area 400a of text fields as shown in FIG. 4D. Performing of the automatic scroll causes the display of a display screen to be changed from FIG. 4D to FIG. 4C. As a result, the controller 210 may perform a control operation for displaying the entirety of the selected text field 420.

After the display position of the text field is adjusted in order to display the entirety of the text field 420, only the part of which has been kept displayed, an exemplary embodiment of the present invention may additionally provide a function of automatically focusing on the text field, the display position of which has been adjusted. Accordingly, the user may receive and use a function, in which text may be entered into a text field, the display position of which has been automatically adjusted even without passively selecting a text field, the display position of which has been automatically adjusted, together with the function of automatically adjusting a display position of a text field.

At this time, in an exemplary embodiment of the present invention, the meaning of a part of a text field in the case of identifying whether the part of the text field is being displayed, conflicts with the meaning of the entirety of the text field as described above.

For example, when a part of a text field is displayed, the relevant text field is displayed in such a manner that the user may not easily recognize text entered into the relevant text field 420 in FIG. 4D. In addition, when a part of a text field is displayed, an entirety of the text field is not displayed in terms of literal meaning.

At this time, a change of a setting may be made in the degree of a part of a text field by a user, a manufacturer, or the like. In this regard, the degree of a part may be set to be equal to or less than a predefined percentage of an entire display size of the text field. For example, when a text field is being displayed with a percentage equal to or less than 40% of an entire display size of the text field, the text field which is being displayed, may be determined as a case where a part of the text field is being displayed.

Meanwhile, when a result of the identification shows that only the part of the selected the text field 420 is displayed according to a scroll request (input) of the user for scrolling the display area 400a of text fields, an exemplary embodiment of the present invention may be modified in such a manner that step S308 may be performed instead of performing step S306.

Figure 5A:
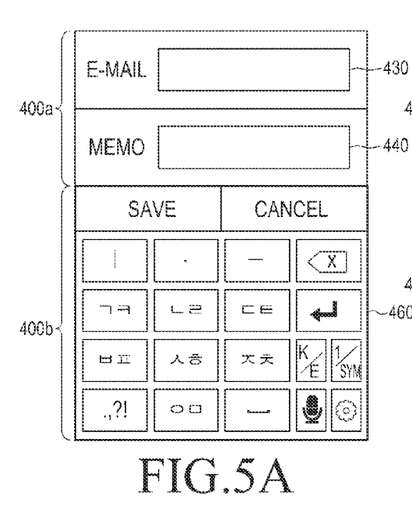
FIGS. 5A through 5D illustrate a process for entering text according to an exemplary embodiment of the present invention.
Figure 5B:
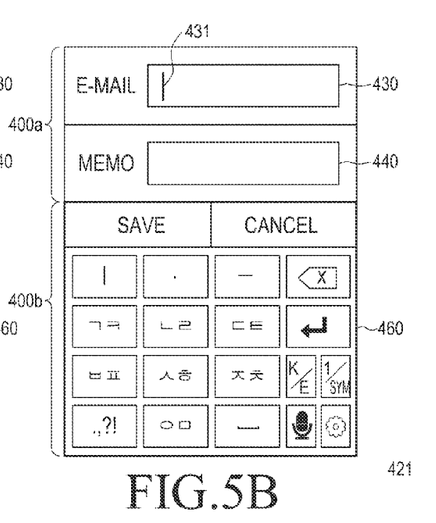

For example, when the result of the identification in step S304 shows that only the part of the selected the text field 420 is displayed as shown in FIG. 4D according to a scroll request (input) of the user for scrolling the display area 400a of text fields, the controller 210 may perform a control operation for focusing on, as shown in FIG. 5B, a text field (for example, the text field 430 as shown in FIG. 4D) which is being displayed at the uppermost position among text fields, an entirety of each of which is being displayed, instead of the selected text field 420, the part of which is being displayed.

Namely, when the result of displaying text fields as shown in FIG. 4D is produced by the scroll request 470 as shown in FIG. 4B, exemplary embodiments of the present invention may provide a function of adjusting a display position (namely, the text field 420 is kept focused) in order to cause the display of the text field 420 to be changed from FIG. 4D to FIG. 4C, or a function of focusing on the text field 430 as shown in FIG. 5B instead of the text field 420 as shown in FIG. 4D.

In steps S307 through S309, the controller 210 performs a control operation for identifying whether text fields other than the selected text field are being displayed in the display area. When a result of the identification shows that the text fields other than the selected text field are being displayed in the display area, the controller 210 performs a control operation for automatically focusing on a text field which is being displayed at the uppermost position in the display area. In contrast, when the result of the identification shows that the text fields other than the selected text field are not being displayed in the display area, the controller 210 performs a control operation so that the SIP is no longer displayed.

When the user continuously enters a scroll input for scrolling the display area 400a in a state where text fields displayed in the display area 400a of text fields are displayed as shown in FIG. 4D, the text fields 430 and 440 are displayed and the text field 420 selected (focused) in order to enter text is not displayed, as shown in FIG. 5A.

Accordingly, when text fields are displayed as shown in FIG. 5A due to the scroll input of the user for scrolling the display area 400a, although the user enters text by using the SIP 460, the user may not identify the selected text field 420. Accordingly, the user may not also identify entered text.

In order to conveniently enter text by addressing the inconvenience of the prior art as described above, when the selected text field is not displayed due to the scroll input for scrolling the display area of text fields, exemplary embodiments of the present invention provide the function of automatically focusing on (selecting) a text field which is being displayed at the uppermost position in the display area of text fields.

For example, in an exemplary embodiment of the present invention, when an entered scroll input causes the display of text fields displayed in the display area 400a of text fields to be changed from FIG. 4B to FIG. 5A, the text field 430 which is being displayed at the uppermost position in the display area 400a, is automatically focused. The controller 210 performs a control operation for notifying the user of the focus on (the selection of) the text field 430 through the blinking of a cursor 431 as shown in FIG. 5B. Text that the user enters by using the SIP 460 is entered into the text field 430.

According to exemplary embodiments of the present invention, the user may automatically select a text field displayed at the uppermost position in the display area 400a through only an operation for entering the scroll of the display area 400a. Accordingly, exemplary embodiments of the present invention enable the user to quickly select a text field into which text is intended to be entered.

Figure 5C:
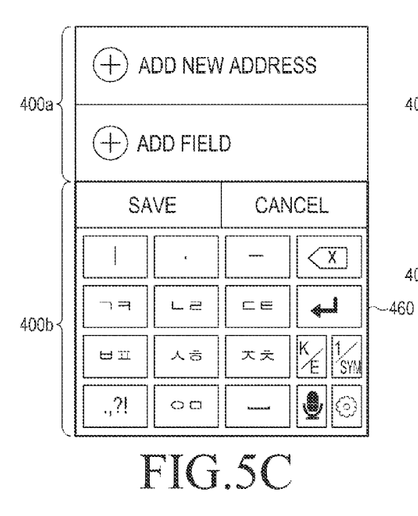
Figure 5D:
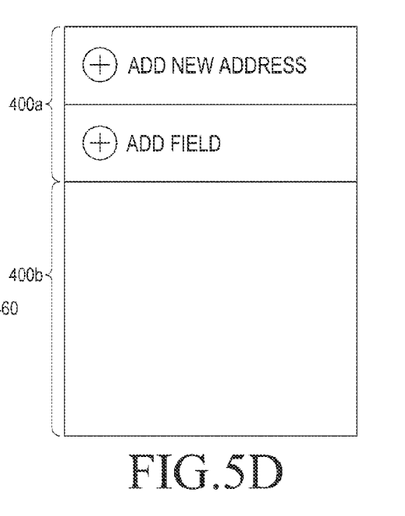

Meanwhile, when the user continuously enters a scroll input for scrolling the display area 400a in a state where text fields displayed in the display area 400a of text fields are displayed as shown in FIG. 4B, as a result of continuously entering of the scroll input may produce a case where text fields displayed in the display area 400a are no longer displayed as shown in FIG. 5C. In this case, the controller may perform a control operation so that the SIP, which is being displayed, is no longer displayed in the display area 400b of the SIP as shown in FIG. 5D.

Exemplary embodiments of the present invention provide an advantage in that the user can more conveniently enter text when text is entered into multiple text fields by using the SIP in the portable terminal.

Therefore, there is an effect in that the user can more conveniently enter text when text is entered into multiple text fields by using the SIP in the portable terminal.

While the invention has been shown and described in detail with reference to certain exemplary embodiments thereof, it will be understood by those skilled in the art that various changes in form and details may be made therein without departing from the spirit and scope of the present invention as defined by the appended claims and their equivalents.

What is claimed is:

1. A method for entering text in a portable terminal, the method comprising:
    displaying a focus on a first text field which is displayed on a first display area and a Soft Input Panel (SIP) on a second display area;
    changing a content displayed on the first display area in response to a requested scroll on the first display area;
    adjusting, when part of the first text field is not displayed on the first display area and the focus is displayed on the first text field according to the change of the content in response to the requested scroll, a display position of the first text field;
    displaying, when none of the first text field is displayed on the first display area according to the change of the content in response to the requested scroll, the focus on a second text field which is being displayed on an uppermost position of the first display area; and
    displaying text, entered through the displayed SIP, into a text field on which the focus being displayed,
    wherein the focus has a predetermined indication which represents a display position of the text.

2. The method of claim 1, wherein the adjusting of the display position of the first text field comprises displaying the focus on the first text field when an entirety of the first text field is being displayed on the first display area according to the adjustment.

3. The method of claim 2, further comprising:
    entering text entered through the displayed SIP into the first text field.

4. The method of claim 1, wherein the adjusting of the display position of the first text field comprises adjusting the display position of the first text field to display an entirety of the first text field on an uppermost position of the first display area.

5. The method of claim 4, further comprising:
    displaying the focus on the first text field, the display position of which has been adjusted.

6. The method of claim 5, further comprising:
    entering text entered through the displayed SIP into the first text field.

7. The method of claim 1, wherein the adjusting of the display position of the first text field comprises displaying the focus on the second text field which is being displayed on an uppermost position among text fields, an entirety of each of which is being displayed on the first display area.

8. The method of claim 7, further comprising:
    entering text entered through the displayed SIP into the second text field.

9. The method of claim 1, further comprising:
    no longer displaying the SIP on the second display area, which is being displayed, when none of text fields are being displayed on the first display area.

10. An apparatus for entering text in a portable terminal, the apparatus comprising:
    a display configured to display a first display area and a second display area; and
    a processor configured to:
        display a focus on a first text field which is displayed on the first display area and a Soft Input Panel (SIP) on the second display area,
        change a content displayed on the first display area in response to a requested scroll on the first display area,
        adjust, when part of the first text field is not displayed on the first display area and the focus is displayed on the first text field according to the change of the content in response to the requested scroll, a display position of the first text field,
        display, when none of the first text field is displayed on the first display area according to the change of the content in response to the requested scroll, the focus on a second text field which is being displayed on an uppermost position of the first display area, and
        display text, entered through the displayed SIP, into a text field on which the focus being displayed,
    wherein the focus has a predetermined indication which represents a display position of the text.

11. The apparatus of claim 10, wherein the processor is further configured to display the focus on the first text field when an entirety of the first text field is being displayed on the first display area according to the adjustment.

12. The apparatus of claim 11, wherein the processor is further configured to enter text entered through the displayed SIP into the first text field.

13. The apparatus of claim 10, wherein the processor is further configured to adjust the display position of the first text field for displaying an entirety of the first text field on an uppermost position of the first display area, when at least part of the first text field is displayed on the first display area after the content is changed in response to the requested scroll.

14. The apparatus of claim 13, wherein the processor is further configured to display the focus on the first text field, the display position of which has been adjusted.

15. The apparatus of claim 14, wherein the processor is further configured to enter text entered through the displayed SIP into the first text field.

16. The apparatus of claim 10, wherein the processor is further configured to display the focus on the second text field which is being displayed on an uppermost position among text fields, an entirety of each of which is being displayed in the first display area, when at least part of the first text field is displayed on the first display area after the content is changed in response to the requested scroll.

17. The apparatus of claim 16, wherein the processor is further configured to enter text entered through the displayed SIP into the second text field.

18. The apparatus of claim 10, wherein the processor is further configured to no longer display the SIP on the second display area, which is being displayed, when none of text fields are being displayed on the first display area.

\* \* \* \* \*